US012441350B2

(12) United States Patent
Kurozumi

(10) Patent No.: US 12,441,350 B2
(45) Date of Patent: Oct. 14, 2025

(54) DRIVER ASSISTANCE DEVICE

(71) Applicant: TOYOTA JIDOSHA KABUSHIKI KAISHA, Toyota (JP)

(72) Inventor: Kazuhiro Kurozumi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 136 days.

(21) Appl. No.: 18/501,271

(22) Filed: Nov. 3, 2023

(65) Prior Publication Data

US 2024/0253656 A1    Aug. 1, 2024

(30) Foreign Application Priority Data

Feb. 1, 2023    (JP) .................................. 2023-014046

(51) Int. Cl.
*B60W 50/14*    (2020.01)
*B60W 30/095*    (2012.01)

(52) U.S. Cl.
CPC ........ *B60W 50/14* (2013.01); *B60W 30/0956* (2013.01); *B60W 2050/143* (2013.01); *B60W 2050/146* (2013.01)

(58) Field of Classification Search
CPC ............. B60W 50/14; B60W 30/0956; B60W 2050/143; B60W 2050/146
USPC ....................................................... 340/436
See application file for complete search history.

(56) References Cited

U.S. PATENT DOCUMENTS

| | | | |
|---|---|---|---|
| 8,483,944 B2 * | 7/2013 | Tsunekawa | G08G 1/166 701/45 |
| 9,969,261 B2 | 5/2018 | Kodama | |
| 10,045,173 B1 | 8/2018 | Morimura et al. | |
| 10,106,157 B2 | 10/2018 | Sawada et al. | |
| 10,150,407 B2 | 12/2018 | Takahashi et al. | |
| 10,696,297 B2 | 6/2020 | Nguyen Van et al. | |
| 10,977,942 B2 * | 4/2021 | Suzuki | G01C 21/3697 |
| 11,001,255 B2 | 5/2021 | Fukuman et al. | |
| 11,110,937 B2 | 9/2021 | Kinoshita et al. | |
| 2010/0042323 A1 * | 2/2010 | Harada | B60W 30/08 701/300 |
| 2010/0214155 A1 * | 8/2010 | Harada | B60R 21/0134 342/147 |
| 2012/0330541 A1 * | 12/2012 | Sakugawa | B60W 30/095 701/301 |
| 2015/0210280 A1 * | 7/2015 | Agnew | B60W 10/192 701/70 |
| 2016/0101779 A1 * | 4/2016 | Katoh | G08G 1/166 340/435 |
| 2017/0101092 A1 | 4/2017 | Nguyen Van et al. | |

(Continued)

FOREIGN PATENT DOCUMENTS

JP    2019-114104 A    7/2019

*Primary Examiner* — Zhen Y Wu
(74) *Attorney, Agent, or Firm* — SoraIP, Inc.

(57) ABSTRACT

The driver assistance device gives a notification to a user of a vehicle. The driver assistance device includes a notification unit that gives the notification according to a possibility of contact between the vehicle and a surrounding object based trajectories of the vehicle and the surrounding object that are predicted based on position potential information indicating a relationship between a plurality of future positions at a second time that is a short amount of time after a first time and probabilities that the vehicle or the surrounding vehicle is located at the future positions at the second time.

2 Claims, 4 Drawing Sheets

(56) References Cited

U.S. PATENT DOCUMENTS

| | | | |
|---|---|---|---|
| 2018/0015918 A1* | 1/2018 | Bae | B60W 30/0953 |
| 2019/0001968 A1 | 1/2019 | Yorifuji et al. | |
| 2019/0344828 A1 | 11/2019 | Omori et al. | |
| 2019/0389488 A1 | 12/2019 | Yamada et al. | |
| 2020/0023836 A1* | 1/2020 | Schneider | B60W 50/16 |
| 2020/0064464 A1* | 2/2020 | Hiromitsu | B60W 30/0953 |
| 2020/0172093 A1* | 6/2020 | Kum | G06N 3/047 |
| 2020/0189573 A1* | 6/2020 | King | B60R 21/0134 |
| 2020/0247318 A1* | 8/2020 | Yamamuro | B60Q 9/008 |
| 2020/0349365 A1* | 11/2020 | Behrendt | G06V 20/64 |
| 2021/0070289 A1* | 3/2021 | Yu | G06V 20/588 |
| 2021/0129836 A1* | 5/2021 | Nguyen | B60W 50/0097 |
| 2021/0300420 A1 | 9/2021 | Matsunaga | |
| 2022/0234581 A1* | 7/2022 | Kim | B60W 10/18 |
| 2022/0289226 A1 | 9/2022 | Maruyama et al. | |
| 2022/0319318 A1* | 10/2022 | Takehara | B60W 40/04 |
| 2023/0099853 A1* | 3/2023 | Mangas | B60W 60/00274 |
| 2024/0190473 A1* | 6/2024 | Akella | B60W 30/0956 |

\* cited by examiner

DRIVER ASSISTANCE DEVICE

CROSS-REFERENCE TO RELATED APPLICATION

This application claims priority to Japanese Patent Application No. 2023-014046 filed on Feb. 1, 2023 incorporated herein by reference in its entirety.

BACKGROUND

1. Technical Field

The present disclosure relates to the technical field of driver assistance devices.

2. Description of Related Art

For example, a device that detects an overlooked risk is proposed as this type of device (see Japanese Unexamined Patent Application Publication No. 2019-114104 (JP 2019-114104 A)). This device detects an overlooked risk based on the risk level for each direction and the percentage of gaze of a driver for each direction. The risk level for each direction is obtained based on data on the surroundings obtained by a surroundings monitoring sensor that monitors the surroundings of the vehicle. The percentage of gaze of the driver for each direction is obtained based on a video taken by an in-vehicle camera.

SUMMARY

The technique described in JP 2019-114104 A has room for improvement. The present disclosure was made in view of the above circumstances, and it is an object of the present disclosure to provide a driver assistance device that can appropriately encourage a driver of a vehicle to confirm safety.

A driver assistance device according to an aspect of the present disclosure is a driver assistance device configured to give a notification to a user of a vehicle. The driver assistance device includes a notification unit configured to give the notification according to a possibility of contact between the vehicle and a surrounding object located around the vehicle, the possibility of contact being based on a trajectory of the vehicle and a trajectory of the surrounding object.

Based on first position potential information indicating a relationship between a plurality of first future positions where the vehicle is likely to be located at a second time that is a short amount of time after a first time and probabilities that the vehicle is located at the first future positions at the second time, an assumption is made that, at the second time, the vehicle is going to be located at a first future position having a relatively high probability out of the first future positions, second potential information is calculated based on the assumption, the second potential information indicating a relationship between a plurality of second future positions where the vehicle is likely to be located at a third time that is a short amount of time after the second time and probabilities that the vehicle is located at the second future positions at the third time, and the trajectory of the vehicle is predicated by calculating the second potential information.

Based on third position potential information indicating a relationship between a plurality of third future positions where the surrounding object is likely to be located at the second time and probabilities that the surrounding object is located at the third future positions at the second time, an assumption is made that, at the second time, the surrounding object is going to be located at a third future position having a relatively high probability out of the third future positions, fourth potential information is calculated based on the assumption, the fourth potential information indicating a relationship between a plurality of fourth future positions where the surrounding object is likely to be located at the third time and probabilities that the surrounding object is located at the fourth future positions at the third time, and the trajectory of the surrounding object is predicated by calculating the fourth potential information.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of a driver assistance device will be described with reference to FIGS. 1 to 6. In the following embodiments, a driver assistance system 1 is taken as an example of a driver assistance device.

Figure 1:
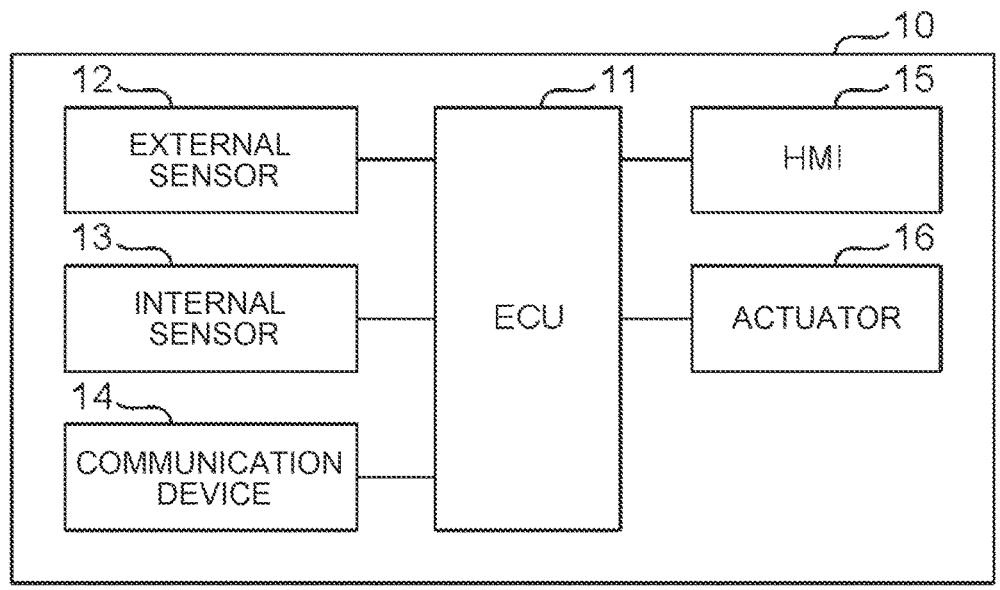
FIG. 1 is a block diagram showing the configuration of a driver assistance system according to an embodiment.
Figure 1:
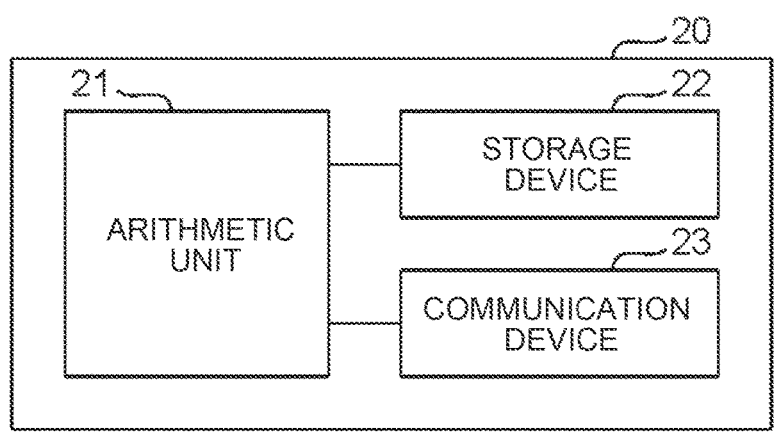

In FIG. 1, the driver assistance system 1 includes a vehicle 10 and a server 20. A vehicle 10 includes an Electronic Control Unit (ECU) 11, an external sensor 12, an internal sensor 13, a communication device 14, a Human Machine Interface (HMI) 15 and an actuator 16. The server 20 includes an arithmetic unit 21, a storage device 22, and a communication device 23. Vehicle 10 and server 20 are configured to be able to communicate via communication devices 14 and 23.

The external sensor 12 is a sensor that detects the circumstances around the vehicle 10. The external sensor 12 includes a front camera disposed so as to capture an image of an area in front of the vehicle 10, an omnidirectional camera having a plurality of cameras disposed so as to capture images to the sides and rear of the vehicle 10, and a millimeter wave radar configured to detect objects in front of the vehicle 10, and a clearance sonar configured to detect objects near or around the vehicle 10. The external sensor 12 may include Light Detection and Ranging (LiDER).

The internal sensor 13 is a sensor that detects the motion state of the vehicle 10. The internal sensors 13 may include wheel speed sensors, acceleration/deceleration sensors, yaw rate sensors, steering angle sensors, accelerator sensors, and brake sensors. Note that the motion state of the vehicle 10 may be referred to as behavior of the vehicle 10.

The HMI 15 is an interface for inputting and outputting information between the driver of the vehicle 10 and the system of the vehicle 10 (for example, the ECU 11). HMI 15 may have a display, buzzer and speaker. The display of the HMI 15 may be a Head Up Display (HUD) or a Multi Information Display (MID) provided on the instrument panel.

Actuator 16 is a device used to control the vehicle 10. Actuators 16 may include drive actuators, brake actuators and steering actuators.

If the vehicle 10 is a vehicle with an engine, the drive actuator may be an actuator for controlling the amount of air supplied to the engine (for example, throttle opening). When the vehicle 10 is a vehicle having a motor as a power source, the motor as a power source may be called a drive actuator. A brake actuator is an actuator for controlling the braking force applied to the wheels of the vehicle 10. A steering actuator is an actuator for controlling steering torque.

The ECU 11 automatically controls at least one of acceleration/deceleration and steering of the vehicle 10 based on the surrounding conditions of the vehicle 10 detected by the external sensor 12 and the motion state of the vehicle 10 detected by the internal sensor 13. It may be configured to be capable of executing controlled automatic driving. That is, the ECU 11 may have an automatic driving function.

Based on the situation around the vehicle 10 detected by the external sensor 12 and the state of motion of the vehicle 10 detected by the internal sensor 13, the ECU 11 controls the vehicle 10 to avoid a collision with an object, for example. It may be configured to be able to execute driver assistance such as issuing a warning to a person, activating a safety device of the vehicle 10, and controlling at least one of acceleration/deceleration and steering of the vehicle 10. In this case, the ECU 11 may constitute part of an advanced driver-assistance system (ADAS).

The ECU 11 may recognize objects existing around the vehicle 10 based on the detection results of the external sensor 12. The objects to be recognized may include moving objects such as vehicles and pedestrians, and stationary objects such as structures and falling objects. The ECU 11 may recognize information related to regulations such as traffic lights, road signs, and road markings based on the detection results of the external sensor 12. Since various existing modes can be applied to the technology for recognizing an object based on the detection result of the external sensor 12, detailed description thereof will be omitted. Note that the objects existing around the vehicle 10 recognized by the ECU 11 may be a specific example of the situation around the vehicle 10.

The ECU 11 transmits, to the server 20 via the communication device 14, information indicating the recognized objects existing around the vehicle 10 and vehicle environment information indicating the motion state of the vehicle 10 detected by the internal sensor 13. The information indicating the object may include information indicating the attribute of the object and information indicating the position of the object. Object attributes may include at least one of pedestrians, vehicles, large vehicles, motorcycles, motorized bicycles, bicycles, structures, and falling objects. The information indicating the position of the object may include the orientation of the object viewed from the vehicle 10 and the distance from the vehicle 10 to the object. The vehicle environment information may include information indicating the attributes of the road on which the vehicle 10 is traveling (for example, a motorway, a road that is not a motorway, and the number of lanes).

The arithmetic unit 21 of the server 20 may cause the storage device 22 to store the vehicle environment information transmitted from the vehicle 10. Note that the arithmetic unit 21 may acquire (in other words, receive) the vehicle environment information from each of a plurality of vehicles (including the vehicle 10) configured to be able to communicate with the server 20. The acquired vehicle environment information may be stored in the storage device 22. As a result, a large-scale database (so-called big data) relating to vehicle environment information may be constructed in the storage device 22.

The arithmetic unit 21 may use the vehicle environment information transmitted from the vehicle 10 for learning processing of a computation model for predicting the trajectory of an object including the vehicle 10. The arithmetic unit 21 may use the vehicle environment information transmitted from the vehicle 10 for prediction processing for predicting the trajectory of an object including the vehicle 10.

The computation model learning process performed by the arithmetic unit 21 will be described. The computational model for predicting the trajectory of the object may mean a computational model that outputs the prediction result of the trajectory of the object when the vehicle environment information is input. An example of such a computational model is a computational model using a neural network (e.g., Convolutional Neural Network: CNN).

The arithmetic unit 21 first classifies a plurality of pieces of vehicle environment information stored in the storage device 22. For example, the arithmetic unit 21 determines whether, the number of lanes, the attributes of objects, the degree of congestion in front of and behind the own vehicle (that is, the vehicle that transmitted the vehicle environment information to the server 20), and A plurality of pieces of vehicle environment information may be classified based on at least one classification item of the direction in which an object exists as seen from the own vehicle. At this time, the arithmetic device 21 may obtain the degree of similarity between one piece of vehicle environment information and another piece of vehicle environment information for the above classification items, and classify a plurality of pieces of vehicle environment information based on the degree of similarity thus obtained.

In the classification described above, for example, when the own vehicle (that is, the vehicle that has transmitted the vehicle environment information to the server 20) is traveling on a motorway where there are no pedestrians or bicycles, the own vehicle is near an intersection with a traffic light. When the vehicle is traveling on a curve, when the vehicle is traveling on a road without a sidewalk, and when there are pedestrians around the vehicle, etc. A plurality of pieces of vehicle environment information are classified (in other words, case-divided). In other words, in the classification described above, even if multiple pieces of vehicle environment information are classified based on road conditions (for example, road shape and slope, road attributes, operating speed, degree of separation between pedestrians and vehicles, traffic volume, etc.) good. In the classification described above, a plurality of pieces of vehicle environment information may be classified based on environmental conditions (for example, time of day, weather, etc.) in addition to road conditions.

The arithmetic unit 21 may further classify the plurality of pieces of vehicle environment information classified by the process described above. For example, the arithmetic unit 21 may further classify and subdivide a plurality of pieces of vehicle environment information classified into the first type by the above processing. At this time, the arithmetic unit 21 determines at least the positional relationship between the own vehicle and the objects existing around the own vehicle, and the relationship between the attributes of the own vehicle and the attributes of the objects existing around the own vehicle. A plurality of pieces of vehicle environment information classified into the first category may be further classified based on one of the classification items. At this time, the arithmetic device 21 may obtain the degree of similarity between one piece of vehicle environment information and another piece of vehicle environment information for the above classification items, and classify a plurality of pieces of vehicle environment information based on the degree of similarity thus obtained. The arithmetic device 21 may perform similar processing on a plurality of pieces of vehicle environment information classified into the n-th class (n is a natural number of 2 or more).

In the further classification described above, for example, when the own vehicle (that is, the vehicle that has transmitted the vehicle environment information to the server 20) is traveling on a motorway, a plurality of pieces of vehicle environment information for each of the following cases may be classified (in other words, cases may be divided): (i) a case in which there is another vehicle ahead of the lane in which the own vehicle is traveling; (ii) a case in which there is another vehicle ahead of the vehicle and in a lane adjacent to the lane in which the vehicle is traveling; (iii) a case in which there is not another vehicle in front of the vehicle; and (iv) a case in which there is another vehicle behind the own vehicle and in a lane adjacent to the lane in which the own vehicle is traveling. That is, in the above-described further classification, a plurality of pieces of vehicle environment information may be further classified based on the relationship between the own vehicle and objects existing around the own vehicle.

As described above, the arithmetic unit 21 may roughly classify a plurality of pieces of vehicle environment information into a plurality of vehicle environment information groups based on, for example, road conditions. Then, the arithmetic unit 21 may further classify a plurality of pieces of vehicle environment information belonging to each of the plurality of vehicle environment information groups, based on the relationship between the own vehicle and objects existing around it.

The arithmetic device 21 may perform machine learning (for example, deep learning) using the vehicle environment information classified as described above as the learning process of the arithmetic model. At this time, the arithmetic device 21 may perform machine learning using a plurality of vehicle environment information belonging to each vehicle environment information group for each vehicle environment information group. The arithmetic unit 21 performs machine learning using a plurality of vehicle environment information belonging to each group for each of a plurality of groups generated by further classifying a plurality of vehicle information groups belonging to each of the plurality of vehicle environment information groups. you can go As a result of the computation model learning processing performed by the arithmetic unit 21, the arithmetic unit 21 may generate (or construct) a plurality of computation models each corresponding to a classification of the vehicle environment information.

Next, prediction processing for predicting the trajectory of an object including the vehicle 10 performed by the arithmetic unit 21 will be described. The outline of the prediction process performed by the arithmetic unit 21 is as follows. That is, the arithmetic unit 21 selects one arithmetic model suitable for the vehicle environment information transmitted from the vehicle 10 from among the plurality of arithmetic models generated by the learning process described above. Then, the arithmetic unit 21 inputs the vehicle environment information transmitted from the vehicle 10 to the selected one arithmetic model, thereby predicting the trajectory of the vehicle 10 and its surrounding objects.

Specifically, the arithmetic unit 21 determines whether the road is a motorway, the number of lanes, the attributes of objects, the degree of congestion in front of and behind the vehicle 10, and the direction of the object as viewed from the vehicle 10. Based on at least one of them, the vehicle environment information group to which the vehicle environment information transmitted from the vehicle 10 belongs may be specified. The "vehicle environment information group" means a vehicle environment information group generated by roughly classifying a plurality of vehicle environment information based on, for example, road conditions in the learning process of the arithmetic model described above.

Next, the arithmetic device 21 may compare the positional relationship between the own vehicle indicated by each of a plurality of pieces of vehicle environment information corresponding to at least a part of the pieces of vehicle environment information belonging to the vehicle environment information group to which the vehicle environment information transmitted from the vehicle 10 belongs (that is, the pieces of vehicle environment information stored in the storage device 22) and the objects present around the own vehicle, and the positional relationship between the vehicle 10 indicated by the vehicle environment information transmitted from the vehicle 10 and the objects present around the vehicle 10 to determine the degree of similarity between the two.

Specifically, based on the position of the object, the arithmetic unit 21 calculates the object existing around the host vehicle indicated by each of the plurality of vehicle environment information corresponding to at least a part of the vehicle environment information and the vehicle environment information transmitted from the vehicle 10. Objects existing around the vehicle 10 indicated by the environment information may be associated (or associated). Next, the arithmetic unit 21 determines whether the attributes of the mutually linked objects match based on the attributes of the mutually linked objects (for example, automobiles, motorcycles, bicycles, pedestrians, etc.). At this time, the arithmetic unit 21 may calculate the Jaccard coefficients related to the mutually linked objects. The arithmetic unit 21 may determine that the attributes of the mutually linked objects match when the calculated Jaccard coefficient is equal to or greater than the first predetermined value.

The arithmetic unit 21 determines the degree of similarity of each of the plurality of vehicle environment information corresponding to at least a part of the vehicle environment information transmitted from the vehicle 10 based on the rate at which the attributes of the mutually linked objects match. In this case, the arithmetic unit 21 may increase the degree of similarity as the ratio of matching attributes of mutually linked objects increases.

Next, the arithmetic unit 21 may extract one or more pieces of vehicle environment information having a degree of similarity higher than the second predetermined value from the plurality of pieces of vehicle environment information corresponding to at least a part of the above. Based on the extracted one or more vehicle environment information, the arithmetic unit 21 extracts an object indicated by the one or more vehicle environment information, and the vehicle environment information transmitted from the vehicle 10 to which the object is linked. Vehicle environment information including objects whose position and/or attributes are significantly different from those of the displayed objects may be excluded.

At this time, the arithmetic unit 21 may determine the vehicle environment information to be excluded based on the Euclidean distance and the Jaccard coefficient for each of the plurality of objects indicated by the extracted one or more pieces of vehicle environment information. For example, let "n" be the number of objects indicated by the vehicle environment information, "x" be the Euclidean distance, and "y" be the Jaccard coefficient. The arithmetic unit 21 may calculate L by the formula "$L=\Sigma(x_i^2+y_i^2)/n$". The calculated value of L becomes larger as the number of objects with large divergence increases. In other words, the calculated value of L becomes smaller as the number of objects with large deviation decreases. The arithmetic unit 21 may exclude vehicle environment information for which the calculated value of L is greater than the third predetermined value.

Figure 2:
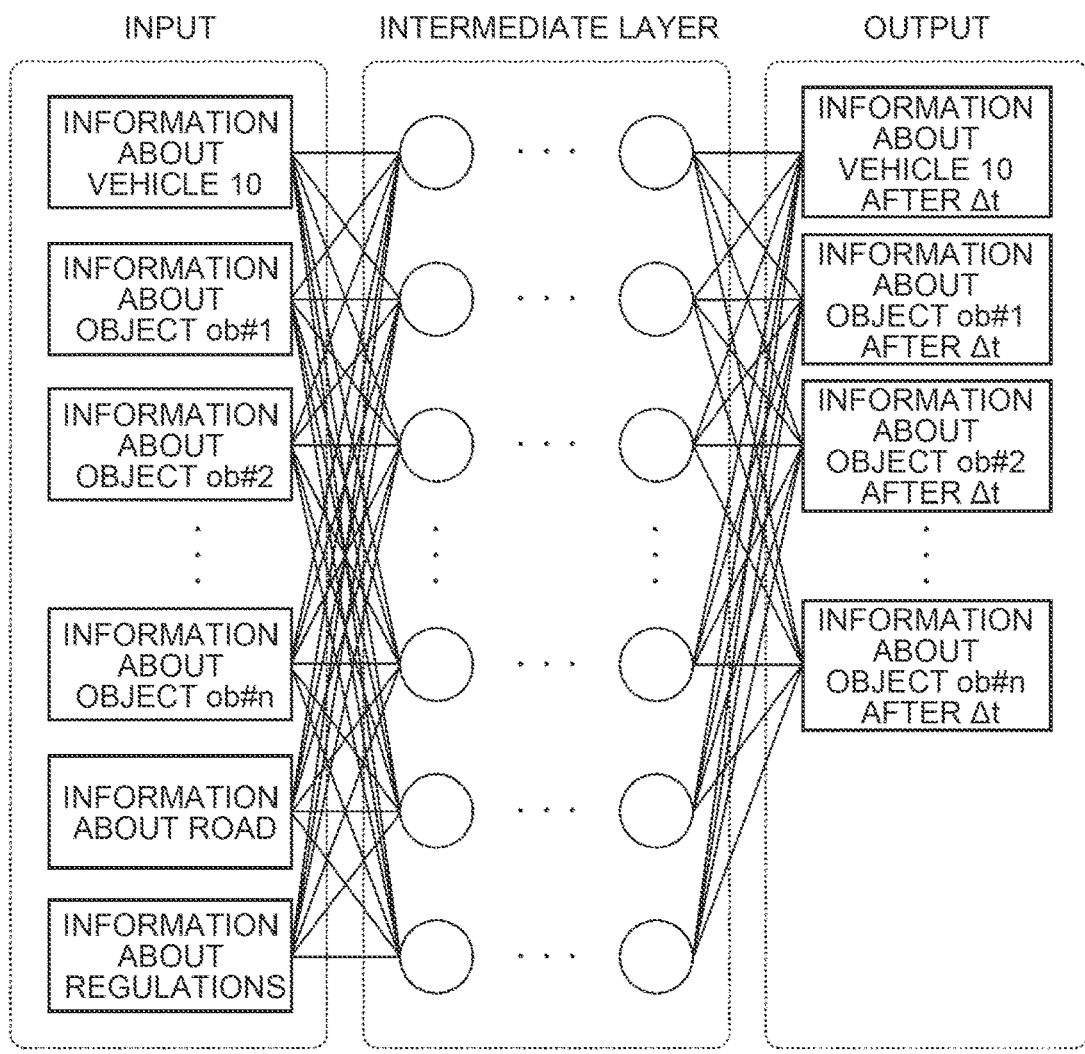
FIG. 2 is a conceptual diagram showing an example of a computing model.

The arithmetic unit 21 may select the computational model corresponding to at least one of the vehicle environment information group and the group to which the vehicle environment information not excluded among the extracted one or more vehicle environment information belongs as the computing model for predicting the trajectory of the object including the vehicle 10. The selected computational model may be a neural network with multiple hidden layers, as shown in FIG. 2. It should be noted that the computational model selected may be a neural network with only one hidden layer.

The arithmetic unit 21 may obtain information related to an object including the vehicle 10 after a short amount of time $\Delta t$ (i.e., one or more objects indicated by the vehicle environment information sent from the vehicle 10) by inputting the vehicle environment information sent from the vehicle 10 to the selected computation model.

For example, as shown in FIG. 2, the computation model includes information about the vehicle 10 (for example, speed and travel route information), information about a plurality of objects ob #1, ob #2, . . . , ob #n (for example, Attribute, lane, direction of object seen from vehicle 10, relative distance to vehicle 10, relative speed to vehicle 10, traveling direction of object seen from vehicle 10, state of lighting equipment), road information (for example, Lateral distance to white line, distance to stop line, distance to traffic light, distance to crosswalk) and information related to regulations (speed limit, light color of traffic light, lane regulations) may be input. The information about the vehicle 10, the information about the plurality of objects ob #1, ob #2, . . . , ob #n, the information about the roads, and the information about the regulations are information indicated by the vehicle environment information sent from the vehicle 10.

For example, as shown in FIG. 2, the computational model stores information about the vehicle 10 after the short amount of time $\Delta t$ and information about a plurality of objects ob #1, ob #2, . . . , ob #n after the short amount of time $\Delta t$. The information about the vehicle 10 after the short amount of time $\Delta t$ may be position potential information indicating the relationship between a plurality of future positions where the vehicle 10 is likely to be located after $\Delta t$ and probabilities that the vehicle 10 is going to be located at the future positions after $\Delta t$.

Figure 3A:
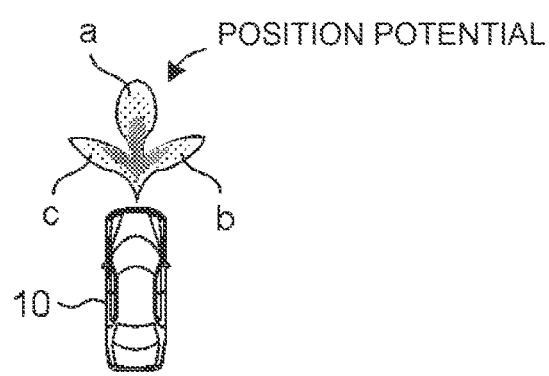
FIG. 3A is a conceptual diagram showing an example of a position potential.

A visual representation of the position potential information is shown in FIG. 3A. Of the position potential shown in FIG. 3A, a portion a indicates a range of future positions in which the vehicle 10 may exist after $\Delta t$ when the vehicle 10 travels straight. Part b shows the range of future positions in which the vehicle 10 may be after $\Delta t$ if the vehicle 10 turns to the right. Part c shows the range of future positions in which the vehicle 10 may be after $\Delta t$ if the vehicle 10 turns to the left. In the position potential shown in FIG. 3A, darker colored portions represent a higher probability that the vehicle 10 will exist after $\Delta t$ compared to lighter colored portions.

Similarly, information on the plurality of objects ob #1 after the short amount of time $\Delta t$ may be position potential information indicating the relationship between a plurality of future positions where the object ob #1 is likely to be located after $\Delta t$ and probabilities that the object ob #1 is located at the future positions after $\Delta t$. Information on the plurality of objects ob #2 after the short amount of time $\Delta t$ may be position potential information indicating the relationship between a plurality of future positions where the object ob #2 is likely to be located after $\Delta t$ and probabilities that the object ob #2 is located at the future positions after $\Delta t$. Information on the plurality of objects ob #n after the short amount of time $\Delta t$ may be position potential information indicating the relationship between a plurality of future positions where the object ob #n is likely to be located after $\Delta t$ and probabilities that the object ob #n is located at the future positions after $\Delta t$.

It is herein assumed that the vehicle environment information transmitted from the vehicle 10 indicates information related to the vehicle 10 at time t1. In this case, by inputting the vehicle environment information transmitted from the vehicle 10 into the computational model, the information relating to the vehicle 10 after $\Delta t$, which is output from the computational model, is the vehicle environment information at time t2 after $\Delta t$ from time t1. It can be said that it shows information related to 10.

The arithmetic unit 21 inputs information (that is, information output from the arithmetic model) related to the vehicle 10 at time t2 to the arithmetic model, and outputs information etc. related to the vehicle 10 at time t3 after $\Delta t$ from time t2. At this time, the arithmetic unit 21 may set the position of the vehicle 10 at the time t2 to the position with the highest probability indicated by the position potential information of the vehicle 10 at the time t2. The arithmetic unit 21 may set the positions of the objects ob #1, ob #2, . . . , ob #n at time t2 to the positions with the highest probability indicated by the position potential information about the objects ob #1, ob #2, . . . , ob #n at time t2.

The arithmetic unit 21 may further input information about the vehicle 10 at time t3 to the calculation model to obtain information about the vehicle 10 at time t4 after $\Delta t$ from time t3. At this time, the arithmetic unit 21 may set the position of the vehicle 10 at time t3 to the position with the highest probability indicated by the position potential information of the vehicle 10 at time t3. Similarly, the arithmetic unit 21 set the positions of the objects ob #1, ob #2, . . . , ob #n at time t3 to the positions with the highest probability indicated by the position potential information about the objects ob #1, ob #2, . . . , ob #n at time t3.

Figure 3B:
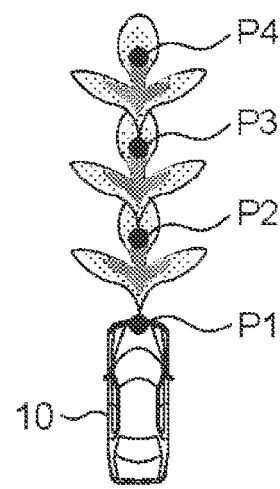
FIG. 3B is a conceptual diagram showing an example of a position potential.

The arithmetic unit 21 can predict the position transition of each of the vehicle 10 and the plurality of objects ob #1, ob #2, . . . , ob #n. For example, the position potential information at times t2, t3, and t4 for the vehicle 10 is visually shown as shown in FIG. 3B. In FIG. 3B, "P1" indicates the position of the vehicle 10 at time t1, "P2"

indicates an example of the position of the vehicle 10 at time t2, and "P3" indicates the position of the vehicle 10 at time t3. "P4" indicates an example of the position of the vehicle 10 at time t4. The arithmetic unit 21 may predict the trajectory of vehicle 10, for example, by connecting positions P1, P2, P3 and P4 in FIG. 3B.

Figure 4:
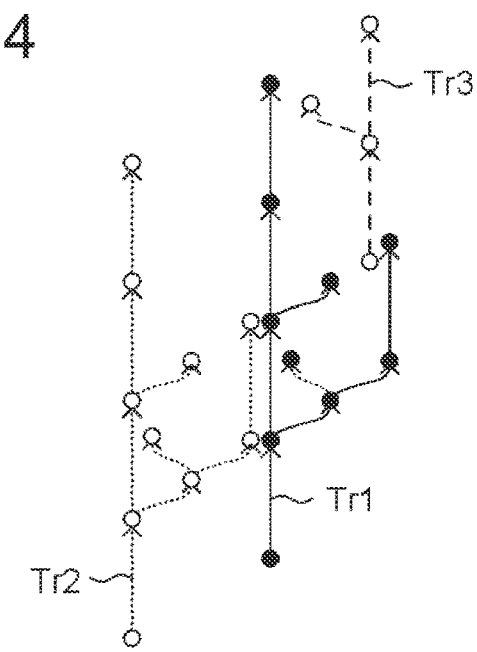
FIG. 4 is a conceptual diagram showing an example of a predicted trajectory.

As a result of such processing, the arithmetic unit 21 may predict a trajectory Tr1 of the vehicle 10, a trajectory Tr2 of the object Ob #1, and a trajectory Tr3 of the object Ob #2, as shown in FIG. 4, for example. For convenience, only the trajectories of the three objects (that is, vehicle 10, object Ob #1, and object Ob #2) are shown in FIG. 4. However, the arithmetic unit 21 may predict the trajectories of four or more object. In order to avoid complication, the position potentials shown in FIG. 3 are not shown in FIG. 4.

Next, the arithmetic unit 21 determines the possibilities of contact between the vehicle 10 and the objects ob #1, ob #2, . . . , ob #n based on the predicted trajectory. As described above, the positional potentials is not shown in FIG. 4, but the trajectory predicted by the arithmetic unit 21 is expressed as a series of positional potentials, as shown in FIG. 3B, for example.

When the arithmetic unit 21 determines the possibility of contact between the vehicle 10 and an object (for example, object Ob #1) around the vehicle 10, at the same time (for example, one of times t2, t3, and t4), the possibility of contact between the vehicle 10 and the object may be determined based on a plurality of future positions indicated by the position potential information of the vehicle 10 and a plurality of future positions indicated by the position potential information of the object.

Figure 5A:
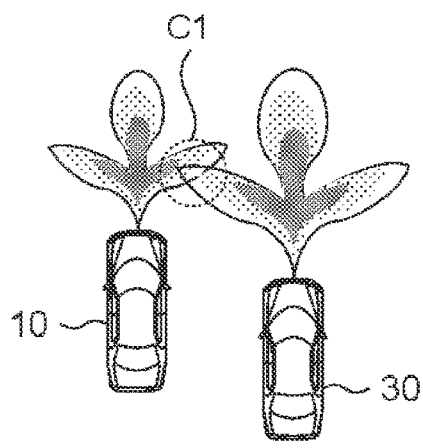
FIG. 5A is a diagram illustrating the concept of the possibility of contact.

In FIG. 5A, assume that a vehicle 30 is an example of the object. As shown in FIG. 5A, when part of the positional potential of the vehicle 10 and part of the positional potential of the vehicle 30 overlap (see the dotted circle C1), the arithmetic unit 21 determines that the vehicle 10 and the vehicle 30 It may be determined that there is a possibility of contact.

When the arithmetic unit 21 determines the possibility of contact between one object (for example, object Ob #1) and another object (for example, object Ob #2) around the vehicle 10, the possibility of contact between the object and the other object may be determined based on), based on the plurality of future positions indicated by the position potential information of the one object and the plurality of future positions indicated by the position potential information of the other objects, at the same time (for example, time t2, t3, and t4).

Figure 5B:
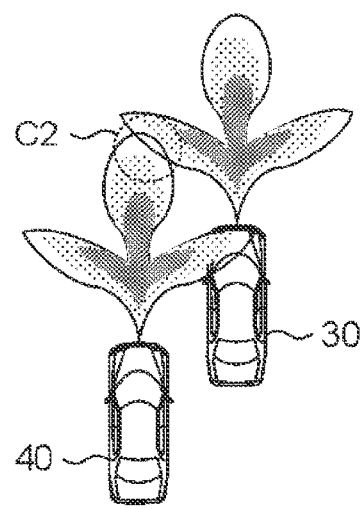
FIG. 5B is a diagram illustrating the concept of the possibility of contact.
Figure 5B:
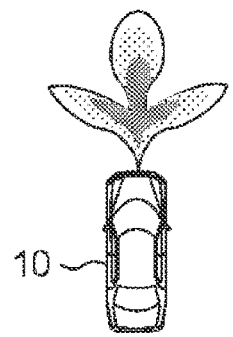

In FIG. 5B, vehicle 30 is an example of the one object, and vehicle 40 is an example of the other object. As shown in FIG. 5B, when part of the positional potential of the vehicle 30 and part of the positional potential of the vehicle 40 overlap (dotted line circle C2), the arithmetic unit 21 determines that the vehicle 30 and the vehicle 40 It may be determined that there is a possibility of contact.

The arithmetic unit 21 determines whether the driver of the vehicle 10 needs to perform safety confirmation action based on the result of the determination regarding the possibility of contact. The result of determination regarding the possibility of contact indicates that there is a possibility of contact between the vehicle 10 and objects around the vehicle 10, and that there is a possibility of contact between one object around the vehicle 10 and another object, the arithmetic unit 21 may determine that the driver of the vehicle 10 needs to perform a safety confirmation action.

The arithmetic unit 21 transmits to the vehicle 10 via the communication device 23 safety confirmation necessity information indicating whether the driver of the vehicle 10 needs to perform the safety confirmation action. When the safety confirmation necessary/unnecessary information indicates that it is necessary to perform a safety confirmation action, the ECU 11 controls the HMI 15 to notify the driver of the vehicle 10 to confirm safety.

Figure 6:
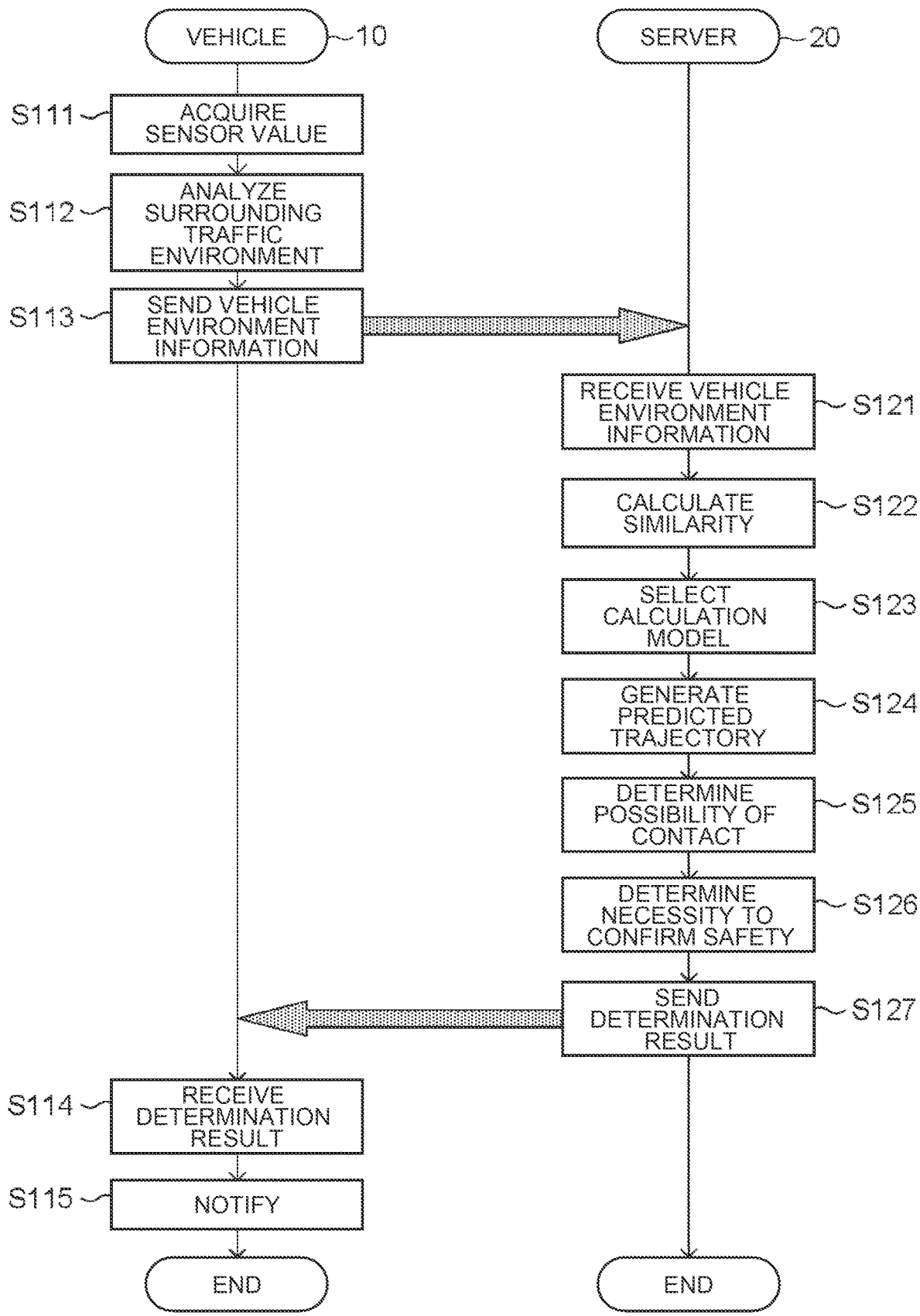
FIG. 6 is a flowchart showing the operation of the driver assistance system according to the embodiment.

The operation of the driver assistance system 1 configured as described above will be described with reference to the flowchart of FIG. 6. In FIG. 6, the ECU 11 of the vehicle 10 acquires detection results (for example, sensor values) by the external sensor 12 and the internal sensor 13 (S111). The ECU 11 may recognize an object existing around the vehicle 10 based on the detection result of the external sensor 12. That is, the ECU 11 may analyze the traffic environment around the vehicle 10 (S112).

The ECU 11 transmits, via the communication device 14, the information indicating the objects existing around the vehicle 10 recognized in the process of S112 and the vehicle environment information indicating the motion state of the vehicle 10 detected by the internal sensor 13. It is transmitted to the server 20 (S113). The server 20 receives the vehicle environment information via the communication device 23 (S121).

The arithmetic unit 21 of the server 20 stores the vehicle environment information received in the process of S121 (that is, the vehicle environment information transmitted from the vehicle 10) and at least part of the plurality of vehicle environment information stored in the storage device 22. The degree of similarity with is calculated (S122). The arithmetic unit 21 selects one arithmetic model from a plurality of arithmetic models based on the result of the process of S122 (S123).

The arithmetic unit 21 inputs the vehicle environment information received in the process of S121 to one arithmetic model selected in S123, thereby generating predicted trajectories for each of a plurality of objects including the vehicle 10 (S124). The arithmetic unit 21 makes a determination regarding the possibility of contact based on the predicted trajectory generated in the process of S124 (S125).

The arithmetic unit 21 determines whether the driver of the vehicle 10 needs to perform safety confirmation action based on the result of the process of S125 (S126). The arithmetic unit 21 transmits safety confirmation necessity information indicating the result of the process of S126 to the vehicle 10 via the communication device 23 (S127). The vehicle 10 receives the safety confirmation necessity information via the communication device 14 (S114). The ECU 11 of the vehicle 10 may control the HMI 15 so as to notify the driver to confirm safety based on the safety confirmation necessity information (S115).

Technical Effect

Sensing or detecting an impending danger is not enough to ensure safety when driving a vehicle. It is necessary to understand the surrounding environment of the vehicle and predict the dangers that will occur in the future before driving the vehicle for preventive driving. However, depending on the driver's situation, the driver may not be able to sufficiently confirm safety. In response to this, it is conceivable that the vehicle side prompts the driver to confirm safety. Here, it takes a certain amount of time for the driver who is urged to confirm safety by the vehicle side to actually confirm safety and recognize the situation. Therefore, when the vehicle prompts the driver to confirm the safety, the vehicle needs to prompt the driver to confirm the safety so as to secure the time required for the driver to recognize the situation.

In the driver assistance system 1, the arithmetic unit 21 of the server 20 predicts the trajectories of a plurality of objects including the vehicle 10 in a period that is n times the short amount of time Δt ("n" is a natural number of 2 or more). Therefore, compared to the comparative example in which the trajectory of an object up to after the short amount of time Δt is predicted, the driver assistance system 1 can predict the possibility of contact between objects not only at a point in the relatively near future but also at a point in the relatively distant future. Therefore, according to the driver assistance system 1, it is possible to make a notification for prompting safety confirmation so that the driver of the vehicle 10 can secure the time required to recognize the situation. That is, according to the driver assistance system 1, it is possible to appropriately prompt the driver of the vehicle 10 to confirm safety.

In the driver assistance system 1, for example, a plurality of computational models corresponding to a plurality of classified environments (or situations) are prepared based on road conditions and the relationship between the vehicle and objects present in its surroundings. Then, when the trajectory of each of a plurality of objects including the vehicle 10 is predicted, one computational model is selected from the multiple computational models based on the vehicle environment information transmitted from the vehicle 10. That is, in the driver assistance system 1, one computational model that is optimal for predicting the trajectory of each of a plurality of objects including the vehicle 10 is selected. Therefore, according to the driver assistance system 1, the trajectory of each of a plurality of objects including the vehicle 10 can be predicted with high accuracy.

As described above, at least one of the possibility of contact between the vehicle 10 and an object around the vehicle 10 and the possibility of contact between one object and another object around the vehicle 10 is indicated. If so, the arithmetic unit 21 may determine that the driver of the vehicle 10 needs to perform the safety confirmation action. That is, in the driver assistance system 1, not only when there is a possibility of contact between the own vehicle (for example, the vehicle 10) and objects around it, but also when objects existing around the vehicle 10 may come into contact with each other. Also in this case, the driver of the vehicle 10 is notified to confirm safety. Therefore, according to the driver assistance system 1, it is possible to prompt the driver to confirm safety not only for direct risks related to the vehicle 10 but also for indirect risks.

Aspects of the disclosure derived from the embodiments described above will be described below.

A driver assistance device according to an aspect of the present disclosure is a driver assistance device that gives a notification to a user of a vehicle. The driver assistance device includes a notification unit configured to give the notification according to a possibility of contact between the vehicle and a surrounding object located around the vehicle, the possibility of contact being based on a trajectory of the vehicle and a trajectory of the surrounding object. Based on first position potential information indicating a relationship between a plurality of first future positions where the vehicle is likely to be located at a second time that is a short amount of time after a first time and probabilities that the vehicle is located at the first future positions at the second time, an assumption is made that, at the second time, the vehicle is going to be located at a first future position having a relatively high probability out of the first future positions, second potential information is calculated based on the assumption, the second potential information indicating a relationship between a plurality of second future positions where the vehicle is likely to be located at a third time that is a short amount of time after the second time and probabilities that the vehicle is located at the second future positions at the third time, and the trajectory of the vehicle is predicated by calculating the second potential information. Based on third position potential information indicating a relationship between a plurality of third future positions where the surrounding object is likely to be located at the second time and probabilities that the surrounding object is located at the third future positions at the second time, an assumption is made that, at the second time, the surrounding object is going to be located at a third future position having a relatively high probability out of the third future positions, fourth potential information is calculated based on the assumption, the fourth potential information indicating a relationship between a plurality of fourth future positions where the surrounding object is likely to be located at the third time and probabilities that the surrounding object is located at the fourth future positions at the third time, and the trajectory of the surrounding object is predicated by calculating the fourth potential information. In the above embodiment, the driver assistance system 1 is an example of the driver assistance device, and the HMI 15 is an example of the notification unit.

In the driver assistance device, the notification unit may be configured to, when a first surrounding object and a second surrounding object are present as the surrounding object, give the notification according to a possibility of contact between the first surrounding object and the second surrounding object in addition to the possibility of contact between the vehicle and the surrounding object, the possibility of contact between the first surrounding object and the second surrounding object being based on a predicted trajectory of the first surrounding object and a predicted trajectory of the second surrounding object.

The present disclosure is not limited to the above embodiment, and can be modified as appropriate within the scope not contrary to the gist or idea of the disclosure that can be read from the scope of claims and the entire specification, and driver assistance devices modified as such are also included in the technical scope of the present disclosure.

What is claimed is:

1. A driver assistance device sending a notification to a driver of a vehicle, comprising:
   a server comprising an arithmetic device, a storage device, and a server communication device,
   wherein the vehicle comprises
      a control device,
      a notification device,
      a storage device,
      a first sensor configured to detect surroundings of the vehicle;
      a second sensor configured to detect a motion state of the vehicle, and
      a vehicle communication device configured to transmit surroundings information detected by the first sensor and motion state information detected by the second sensor to the server,
   the server is configured to
      receive the surroundings information and the motion state information transmitted from the vehicle communication device,
      store the surroundings information and the motion state information in the arithmetic device, calculate a degree of similarity between the surroundings information and the motion state information and vehicle environment information stored in the storage device, select a computational model based on the calculated similarity, input the surroundings information and the motion state information into the selected computational model to generate predicted trajectories for objects including the vehicle, determine a possibility of contact between the vehicle and at least one object based on the predicted trajectories, determine whether the driver of the vehicle needs to perform a safety confirmation action based on the possibility of contact, and transmit, via the server communication device, safety confirmation necessity information indicating whether the driver needs to perform the safety confirmation action, to the vehicle, and the notification device is configured to provide the notification based on the possibility of contact between the vehicle and the at least one object, the possibility being determined from a trajectory of the vehicle and a trajectory of surrounding object:

the trajectory of the vehicle is predicted:

based on first position potential information indicating a relationship between a plurality of first future positions where the vehicle may be present at a second time point that is a first predetermined time after a first time point and probabilities that the vehicle is present at each of the plurality of first future positions at the second time point, and assuming that the vehicle is present, at the second time point, at one of the plurality of first future positions having a probability equal to or greater than a first threshold, by calculating second position potential information indicating a relationship between a plurality of second future positions where the vehicle may be present at a third time point that is a second predetermined time after the second time point, and probabilities that the vehicle is present at each of the plurality of second future positions at the third time point, and the trajectory of surrounding object is predicted:

based on third position potential information indicating a relationship between a plurality of third future positions where the surrounding object present around the vehicle may be present at the second time point, and probabilities that the surrounding object is present at each of the plurality of third future positions at the second time point, assuming that the surrounding object is present, at the second time point, at one of the plurality of third future positions having a probability equal to or greater than a second threshold, by calculating fourth position potential information indicating a relationship between a plurality of fourth future points where the surrounding object may be present at the third time point, and probabilities that the surrounding object is present at each of the plurality of fourth future positions at the third time point.

2. The driver assistance device according to claim 1, wherein the surrounding object includes a first surrounding object and a second surrounding object, and in a case where the first surrounding object and the second surrounding object are present, the notification device is further configured to provide the notification based on a possibility of contact between the first surrounding object and the second surrounding object, in addition to a possibility of contact between the vehicle and the surrounding object, based on predicted trajectories of the first and second surrounding objects.

\* \* \* \* \*